US008843669B2

(12) United States Patent
Pavlov

(10) Patent No.: US 8,843,669 B2
(45) Date of Patent: Sep. 23, 2014

(54) GUEST PARTITION HIGH CPU USAGE MITIGATION WHEN PERFORMING DATA TRANSFERS IN A GUEST PARTITION

(75) Inventor: Vladimir Pavlov, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 198 days.

(21) Appl. No.: 13/228,974

(22) Filed: Sep. 9, 2011

(65) Prior Publication Data

US 2013/0067122 A1    Mar. 14, 2013

(51) Int. Cl.
G06F 13/28 (2006.01)
G06F 9/455 (2006.01)
G06F 9/46 (2006.01)

(52) U.S. Cl.
USPC ................. 710/22; 718/1; 718/105

(58) Field of Classification Search
None
See application file for complete search history.

(56) References Cited

U.S. PATENT DOCUMENTS

| | | | |
|---|---|---|---|
| 6,725,284 B2 | 4/2004 | Arndt | |
| 6,973,510 B2 | 12/2005 | Arndt et al. | |
| 6,985,951 B2 | 1/2006 | Kubala et al. | |
| 7,383,555 B2 | 6/2008 | Billau et al. | |
| 7,412,705 B2 | 8/2008 | Misra | |
| 7,613,898 B2 | 11/2009 | Haertel et al. | |
| 7,870,298 B2 | 1/2011 | Shima et al. | |
| 7,996,569 B2 | 8/2011 | Aloni et al. | |
| 8,001,543 B2 | 8/2011 | Wooldridge et al. | |
| 2005/0235068 A1 | 10/2005 | Moriki et al. | |
| 2007/0028244 A1 | 2/2007 | Landis et al. | |
| 2007/0083862 A1* | 4/2007 | Wooldridge et al. | ............. 718/1 |
| 2010/0169536 A1 | 7/2010 | Shedel et al. | |
| 2012/0216188 A1 | 8/2012 | Tsirkin | |

OTHER PUBLICATIONS

Kleidermacher, "Hypervisors and the Power Architecture", http://www.edatechforum.com/eda-topics/embedded/hypervisors-and-the-power-architecture/, accessed Feb. 17, 2011, 8 pages.
"Hyper-V", http://en.wikipedia.org/wiki/Hyper-V, accessed Jul. 20, 2011, 9 pages.
"Server Virtualization with Hyper-V", Chapter 29, Dec. 14, 2009, 1215-1294.
"Windows Server 2008 Hyper-V", Provisioning Hyper-V Virtual Machine in Hosting Environment, Microsoft Corporation, Copyright 2007, 59 pages.
"Potential Performance Bottlenecks in an NDIS Virtualized Networking Environment", http://msdn.microsoft.com/en-us/library/hh205395(v=vs.85).aspx, accessed Jul. 21, 2011, 1 page.
Baker, "Windows Server Virtualization & The Windows Hypervisor", Microsoft Corporation, Black Hat, 2007, 46 pages.

* cited by examiner

Primary Examiner — Idriss N Alrobaye
Assistant Examiner — David Martinez
(74) Attorney, Agent, or Firm — Jim Sfekas; Kate Drakos; Micky Minhas

(57) ABSTRACT

An invention is disclosed for offloading operations, such data transfers, of a guest partition to a host partition. A guest operating system is presented with virtualized resources rather than physical resources—e.g. a guest virtualized processor, guest virtualized memory space, and a guest virtualized direct memory access (DMA) controller. The guest partition can detect the guest operation system attempt to initiate a data transfer, and can instruct the host partition to perform the data transfer. The guest partition need not perform the data transfer using the guest virtual resources. The host partition can perform the data transfer to a remote computing as instructed by the guest partition without copying the data to the host virtualized memory space. The host partition can provide a message to the guest partition indicative of a status of the data transfer.

20 Claims, 5 Drawing Sheets

GUEST PARTITION HIGH CPU USAGE MITIGATION WHEN PERFORMING DATA TRANSFERS IN A GUEST PARTITION

CROSS REFERENCE TO RELATED APPLICATIONS

This application has subject matter related to matter in patent application Ser. No. 13/096,680 filed on Apr. 28, 2011, the contents of which is incorporated by reference herein in its entirety.

BACKGROUND

A virtual machine is a software representation of a physical machine upon which programs execute. A virtual machine presents to a program, such as a guest operating system (OS), software representation of physical resources, which may include virtualized versions of one or more central processing units (CPUs), system memory, and peripheral devices. Attempts by the guest OS to access these virtual resources, such as the virtualized system memory, are typically received by the virtual machine and executed on the virtualized CPU of the virtual machine.

Most, or all, of the virtual machines operate with a limited number of virtual CPUs. The limited number of virtual CPUs can constrain the guest OS operations, which may include processor intensive operations such as transferring data from one memory location to another memory. In addition, virtual machines are typically partitioned with limited capability to share their virtual resources across the partitions. Thus, operations that are offloaded from one virtual machine to another virtual machine are often offloaded inefficiently because the operation offloads may require high CPU usage of the one virtual machine or may require copying data between the virtual machine memories.

SUMMARY

In various embodiments, methods and systems are disclosed for enabling virtual machines to share resources and to offload operations of guest OSes from one set of virtual resources to another.

In an embodiment, a virtual machine representative of a guest partition on physical hardware can send an instruction to another virtual machine representative of a host partition on the physical hardware. The instruction from the guest partition to the host partition can include a description of the guest OS operation, such as a data read, write, or copy, the addresses of the source and destination memory spaces, and the amount of data to be processed.

In an embodiment, upon the receipt of the instruction from the guest partition, the host partition can process and execute the instruction using the host virtual resources using the available host virtual resources, such as host CPUs, host direct memory access (DMA) controllers, or host devices capable of DMA transfers.

In an embodiment, the host partition can, in turn, send a message to the guest partition indicative of a status of the guest partition instruction that the host partition received. For example, the message can include an indication that the guest partition instruction was processed completely.

In an embodiment where the guest partition sends an instruction to the host partition to execute a guest OS operation, the guest partition does not execute the guest OS operation contained in the instruction on the guest partition virtual resources. Instead, the guest partition offloads the guest OS operation to the host partition using the instruction. As such, the guest partition virtual resources can be freed and can be allocated to other operations.

In addition to the foregoing, other aspects are described in the claims, drawings, and text forming a part of the present disclosure. It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION OF ILLUSTRATIVE EMBODIMENTS

Figure 1:
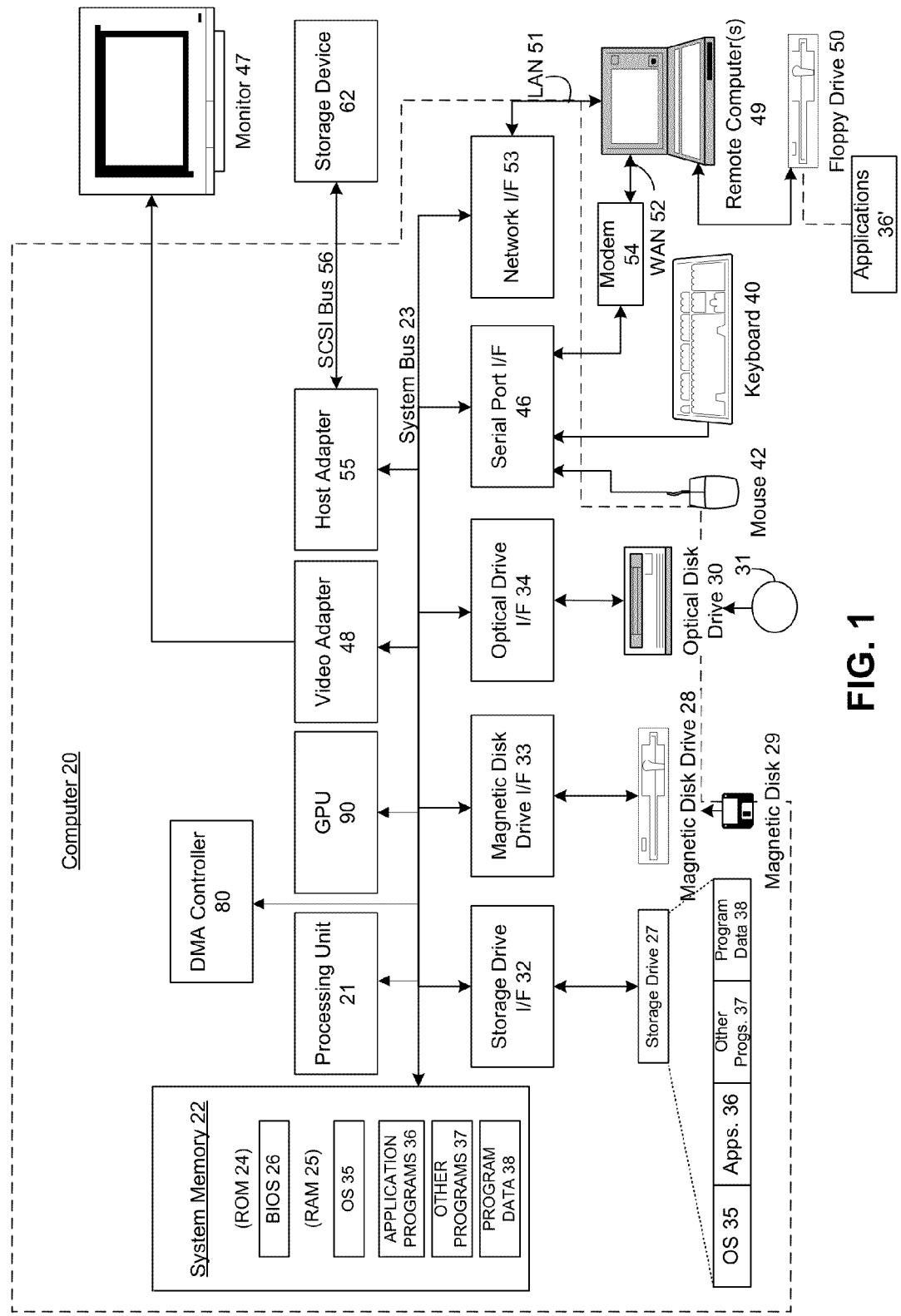
FIG. 1 depicts an example general purpose computing environment in which embodiments of the invention may be implemented.

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The term circuitry used throughout the disclosure can include hardware components such as hardware interrupt controllers, hard drives, network adaptors, graphics processors, hardware based video/audio codecs, and the firmware/software used to operate such hardware. The term circuitry can also include microprocessors configured to perform function(s) by firmware or by switches set in a certain way or one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be executed by a logical processor. Since one skilled in the art can appreciate that the state of the art has evolved to a point where there is little difference between hardware, software, or a combination of hardware/software, the selection of hardware versus software to effectuate functions is merely a design choice. Thus, since one of skill in the art can appreciate that a software process can be transformed into an equivalent hardware structure, and a hardware structure can itself be transformed into an equivalent software process, the selection of a hardware implementation versus a software implementation is left to an implementer.

Embodiments of the invention may execute on one or more computer systems. FIG. 1 and the following discussion are intended to provide a brief general description of a suitable computing environment in which embodiments of the invention may be implemented.

FIG. 1 depicts an example general purpose computing system. The general purpose computing system may include a conventional computer 20 or the like, including processing unit 21. Processing unit 21 may comprise one or more processors, each of which may have one or more processing cores. A multi-core processor, as processors that have more than one processing core are frequently called, comprises multiple processors contained within a single chip package.

Computer 20 may also comprise graphics processing unit (GPU) 90. GPU 90 is a specialized microprocessor optimized to manipulate computer graphics. Processing unit 21 may offload work to GPU 90. GPU 90 may have its own graphics memory, and/or may have access to a portion of system memory 22. As with processing unit 21, GPU 90 may comprise one or more processing units, each having one or more cores.

Computer 20 may also comprise a system memory 22, in which at least portion of programming to carry out aspects of the invention may be stored, and a system bus 23 that communicative couples various system components including the system memory 22 to the processing unit 21 when the system is in an operational state. The system memory 22 can include read only memory (ROM) 24 and random access memory (RAM) 25. A basic input/output system 26 (BIOS), containing the basic routines that help to transfer information between elements within the computer 20, such as during start up, is stored in ROM 24. The system bus 23 may be any of several types of bus structures including a memory bus or memory controller, a peripheral bus, or a local bus, which implements any of a variety of bus architectures. Coupled to system bus 23 may be a direct memory access (DMA) controller 80 that is configured to read from and/or write to memory independently of processing unit 21. Additionally, devices connected to system bus 23, such as storage drive I/F 32 or magnetic disk drive I/F 33 may be configured to also read from and/or write to memory independently of processing unit 21, without the use of DMA controller 80.

The computer 20 may further include a storage drive 27 for reading from and writing to a hard disk (not shown) or a solid-state disk (SSD) (not shown), a magnetic disk drive 28 for reading from or writing to a removable magnetic disk 29, and an optical disk drive 30 for reading from or writing to a removable optical disk 31 such as a CD ROM or other optical media. The storage drive 27, magnetic disk drive 28, and optical disk drive 30 are shown as connected to the system bus 23 by a storage drive interface 32, a magnetic disk drive interface 33, and an optical drive interface 34, respectively. The drives and their associated computer-readable storage media provide non-volatile storage of computer readable instructions, data structures, program modules and other data for the computer 20. Although the example environment described herein employs a storage drive, a removable magnetic drive 29 and a removable optical disk 31, it should be appreciated by those skilled in the art that other types of computer readable media which can store data that is accessible by a computer, such as flash memory cards, digital video discs or digital versatile discs (DVDs), random access memories (RAMs), read only memories (ROMs) and the like may also be used in the example operating environment. Generally, such computer readable storage media can be used in some embodiments to store processor executable instructions embodying aspects of the present disclosure and operable to convert computer 20 into a special purpose computing device. Computer 20 may also comprise a host adapter 55 that connects to a storage device 62 via a small computer system interface (SCSI) bus 56.

A number of program modules comprising computer-readable instructions may be stored on computer-readable media such as the storage disk, magnetic disk 29, optical disk 31, ROM 24 or RAM 25, including an operating system 35, one or more application programs 36, other program modules 37, and program data 38. Upon execution by the processing unit, the computer-readable instructions cause actions described in more detail below to be carried out or cause the various program modules to be instantiated. A user may enter commands and information into the computer 20 through input devices such as a keyboard 40 and mouse 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device can also be connected to the system bus 23 via an interface, such as a video adapter 48. In addition to the monitor 47, computers typically include other peripheral output devices (not shown), such as speakers and printers.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface card (NIC) or adapter 53. When used in a WAN networking environment, the computer 20 can typically include a modem 54 or other means for establishing communications over the wide area network 52, such as the INTERNET. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In an embodiment where computer 20 is configured to operate in a networked environment, OS 35 is stored remotely on a network, and computer 20 may netboot this remotely-stored OS rather than booting from a locally-stored OS. In an embodiment, computer 20 comprises a thin client where OS 35 is less than a full OS, but rather a kernel that is configured to handle networking and display output, such as on monitor 47.

Figure 2:
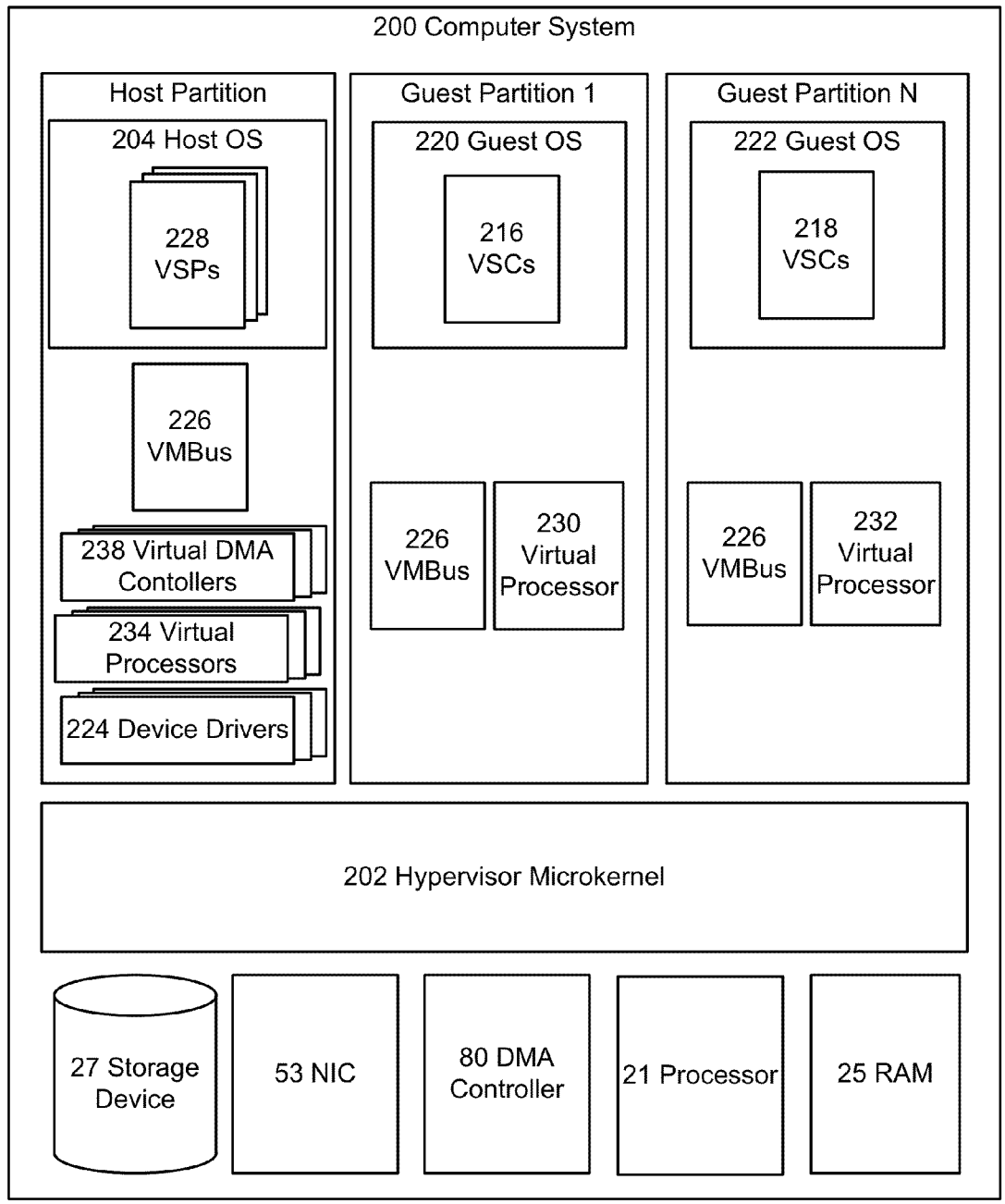
FIG. 2 depicts an example computing system containing a host partition and a guest partition environment in which embodiments of the invention may be implemented.

FIG. 2 illustrates an exemplary virtualization platform that can be used to generate virtual machines. In this embodiment, hypervisor microkernel 202 can be configured to control and arbitrate access to the hardware of computer system 200, and computer system 200 may be embodied within computer 20 of FIG. 1. Hypervisor microkernel 202 can generate execution environments called partitions such as guest partition 1 through guest partition N (where N is an integer greater than 1). Here, a guest partition is the basic unit of isolation supported by hypervisor microkernel 202. A guest partition may also be referred to as a child partition. Hypervisor microkernel 202 can isolate processes in one partition from accessing another partition's resources. Each guest partition can be mapped to a set of hardware resources, e.g., memory, devices, processor cycles, etc., that is under control of the hypervisor microkernel 202. In embodiments hypervisor microkernel 202 can be a stand-alone software product, a part of an operating system, embedded within firmware of the motherboard, specialized integrated circuits, or a combination thereof.

Hypervisor microkernel 202 can enforce partitioning by restricting a guest operating system's view of the memory in a physical computer system. When hypervisor microkernel 202 instantiates a virtual machine, it can allocate pages, e.g., fixed length blocks of memory with starting and ending addresses, of system physical memory (SPM) to the virtual machine as guest physical memory (GPM). Here, the guest's restricted view of system memory is controlled by hypervisor microkernel 202. The term guest physical memory is a shorthand way of describing a page of memory from the viewpoint of a virtual machine and the term system physical memory is shorthand way of describing a page of memory from the viewpoint of the physical system. Thus, a page of memory allocated to a virtual machine will have a guest physical address (the address used by the virtual machine) and a system physical address (the actual address of the page).

A guest operating system may virtualize guest physical memory. Virtual memory is a management technique that allows an operating system to over commit memory and to give an application sole access to a contiguous working memory. In a virtualized environment, a guest operating system can use one or more page tables to translate virtual addresses, known as guest virtual addresses into guest physical addresses. In this example, a memory address may have a guest virtual address, a guest physical address, and a system physical address.

Each guest partition can include one or more virtual processors such as virtual processors 230 through 232 that guest operating systems 220 through 222 can manage and schedule threads to execute thereon. Generally, the virtual processors 230 through 232 are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in these example embodiments, multiple virtual processors can be simultaneously executing while, for example, another logical processor is executing hypervisor instructions.

In the above example, computer system 200 includes a host partition 204 that can also be thought of as domain 0 in the open source community. A host partition may also be referred to as a parent partition or a root partition. The host partition 204 can include device drivers 224 that allow the interaction of applications with the underlying physical hardware of computer system 200. As such, the host partition 204 can have access to physical hardware of computer system 200, such as processor 21 and DMA controller 80. The host partition 204 can also include a number of virtual DMA controllers 238 that can represent a virtualization of the DMA controller 80. In addition, the host partition 204 can include a number of virtual processors 234 that the host partition can manage and schedule threads to execute thereon. Hypervisor microkernel 202 can allocate pages of system physical memory (SPM) to the host partition as host physical memory (HPM).

The host partition 204 can be configured to provide resources to guest operating systems executing in guest partitions 1-N by using virtualization service providers 228 (VSPs) that are also known as back-end drivers in the open source community. In this example architecture, the host partition 204 can gate access to the underlying hardware. The VSPs 228 can be used to multiplex the interfaces to the hardware resources by way of virtualization service clients (VSCs) that are also known as front-end drivers in the open source community. The VSCs 216 and 218 can be different than the rest of the drivers in the guest partitions in that they may be supplied with a hypervisor, not with a guest. In an exemplary embodiment, the path used to by VSPs 228 and VSCs 216 and 218 can be thought as the virtualization path.

The host partition VSPs 228 and the guest partition VSCs 216 and 218 can connect to a virtual machine bus 226 (VMBus). The VMBus 226 is a logical channel which enables inter-partition communication. The guest partitions requests to the virtual resources, such as the virtual processors 230 and 232, can be redirected via the VMBus 226 to the devices, such as the virtual processors 228, in the host partition which can manage the requests. The response from the host partition to the guest partition can also redirected via the VMBus 226. This entire process can be transparent to the guest OSes 220 and 222. In another embodiment, the host partition VSPs 228 and the guest partition VSCs 216 and 218 can communicate over a network, such as a TCP/IP network, by sending and receiving message packets.

Generally speaking, and as illustrated by the figures, the combination of virtual processors, various VSCs, and memory in a partition can be considered a virtual machine such as virtual machine 240 or 242.

Guest operating systems (220 and 222) can be any operating system such as, for example, operating systems from Microsoft®, Apple®, the open source community, etc. The guest operating systems can include user/kernel modes of operation and can have kernels that can include schedulers, memory managers, etc. Generally speaking, kernel mode can include an execution mode in a processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

In an embodiment, one or more guest OSes, such as guest OSes 220 and 222, and a host OS, such as host OS 204, execute on a physical host computer, such as computer system 200. A guest OS produces graphical output (e.g. application windows) in the guest partition memory space. The guest partition associated with the guest OS can transfer the graphical output data to at least one remote computing device connected to the computer system 200 over a network, where the graphical output can be displayed to at least one remote user. The guest partition can transfer the graphical output to a memory space associated with the at least one remote display device. The guest partition can also transfer the graphical output to a host memory space. The guest partition can instruct the host partition to process a second transfer of the graphical output from the host memory space to the memory space of the at least one remote display device. The host partition can then execute the second graphical output transfer as instructed by the guest partition. The transfer of graphical output between memory spaces can be accomplished using direct memory access transfers or DMA transfers.

In an embodiment, the guest partition can inform the host partition of the address of the guest memory space containing the graphical output and instruct the host partition to transfer the graphical output to the memory space of the at least one remote computing device. The address of the guest memory space containing the graphical output can be translated into a host memory space address without transferring the graphical output from the guest memory space to the host memory space. The host partition can then use the host memory space address to access and transfer the graphical output to the memory space of the at least one remote computing device. The host partition can accomplish the graphical output transfer to the remote computing device using a DMA transfer.

In a direct memory access (DMA), some hardware resources of a host computer may read from or write to system memory independently of the CPU. The CPU may execute an instruction that results in sending an instruction to the DMA device to initiate the read/write, but the read/write itself is performed independently of the CPU inasmuch as the CPU may perform other operations while the DMA device carries out the read/write. When the DMA device has completed the read/write, it may send an interrupt to the CPU indicating that the read/write has been completed. Examples of hardware devices that commonly have DMA capability include dedicated DMA controllers, disk drive controllers, sound cards, GPUs, and network cards.

In a DMA transfer, a segment, or block, of memory is copied from a source device to a destination device (both of which may be the same device, with the source and destination being different locations on the device). In some system architectures, the DMA transfer is performed by a DMA controller. The communications bus via which this DMA transfer occurs is sometimes referred to as an ISA (Industry Standard Architecture) bus. In a PCI (Peripheral Component Interconnect) bus, PCI devices are configured to perform DMA transfers without the use of a separate DMA controller, inasmuch as the PCI device itself comprises its own DMA controller. This may be known as bus mastering DMA. In the bus mastering scenario, the PCI device involved with the transfer performs the transfer. There are also various system-on-a-chip architectures where a DMA controller or DMA engine is embedded within the one chip that also performs CPU functions.

Figure 3:
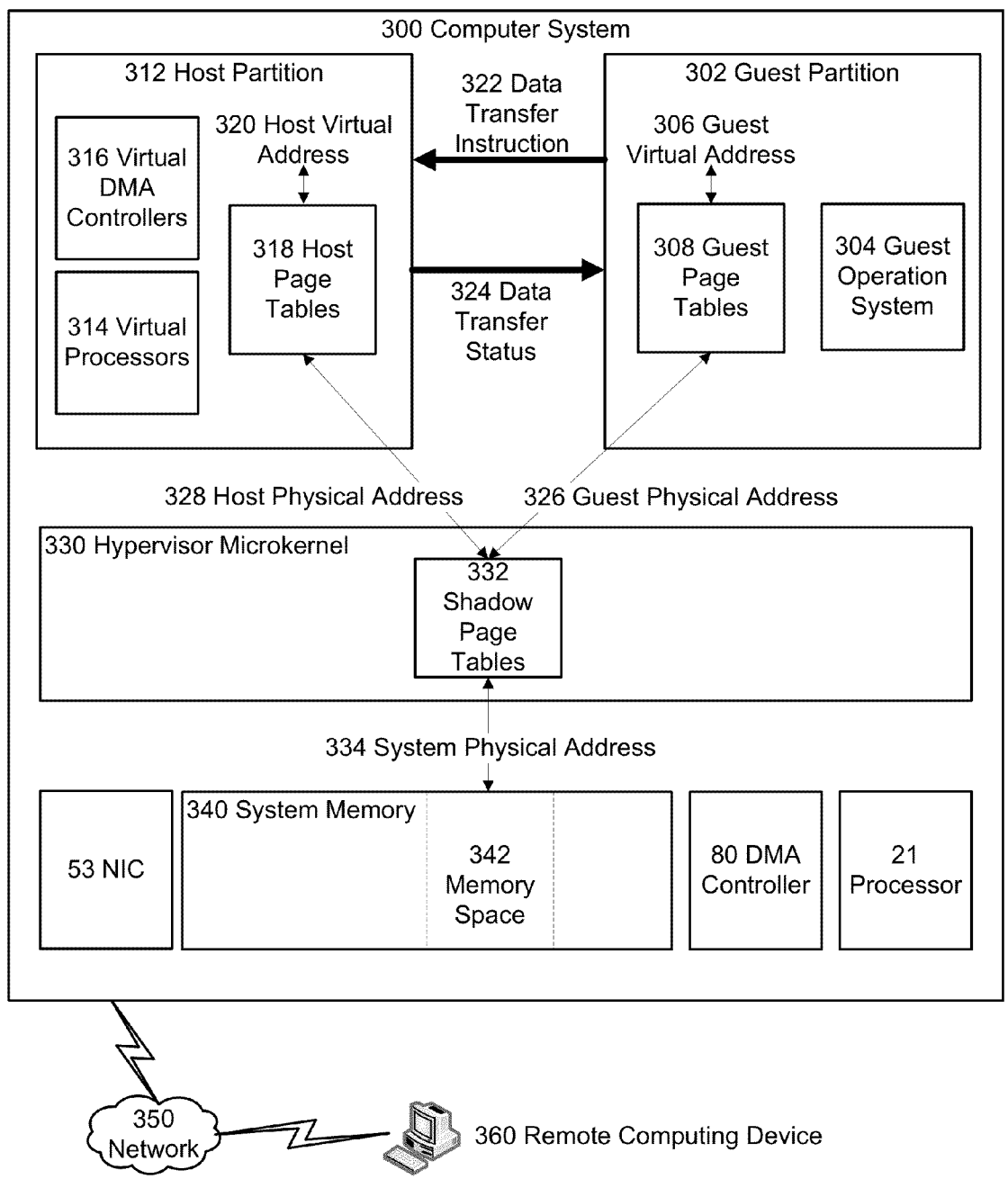
FIG. 3 depicts an example system where a guest partition interacts with a host partition to offload data transfer operations.

FIG. 3 depicts an example computer system 300 where a guest partition 302 interacts with a host partition 312 to offload data transfer operations from the guest partition 302 to the host partition 312. Data can be transferred between a memory space 342 associated with the guest partition 302 and a memory space associated with a remote computing device 360. The depicted elements of FIG. 3 may be embodied, for instance, in computer 20 of FIG. 1. Computer system 300 may also have one or more of the components of computer system 200 of FIG. 2. Hypervisor microkernel 330 can comprise some or all components of hypervisor microkernel 202 of FIG. 2. Guest partition 302 may be the partition 1 depicted in FIG. 2 and host partition 312 may be the host partition depicted in FIG. 2. Memory space 342 can be a portion of a system memory 340 that can comprise system memory 22 of FIG. 1 or RAM 25 of FIG. 2. Remote computing device 360 may be effectuated by a computer that includes components of computer 20 depicted in FIG. 1, or may be effectuated by components of a computer that is similar to computer 200 depicted in FIG. 2. In such embodiments, network 350 can be a network that allows communications between the computer system 300 and the remote computing device 360, such as a TCP/IP based network. Data can be transferred between the computer system 300 and the remote computing device 360 using the network 350. For example, the computer device 300 and the remote computing device 360 can comprise network interface cards (NIC) 53 of FIG. 1 that can allow the two devices to communicate over the network 350. The remote computing device 360 can also be a guest partition within the computer system 300. In such embodiment, the network 350 can be a network that allows inter-partition communications, such as a VMBus or a network contained within the hypervisor microkernel 330.

A mapping of memory addresses can be used to enable applications running on a guest operation system (OS), such as a guest OS 304 of the guest partition 302, to read, write, and copy data from and to a memory space of the computer system 300, such as the memory space 342.

As previously described, the hypervisor 330 can allocate a system memory space, such as the memory space 342, to a partition, such as the guest partition 302. In an embodiment, the system memory space can be addressed using a system physical address (SPA), such as SPA 334. The hypervisor microkernel 330 can translate the SPA into a guest physical address (GPA), such as GPA 326, and can present the GPA to the guest partition. From the perspective of the guest partition, the GPA may appear to start at physical address zero or any other page-aligned physical address and may span as large a region as is supported by the hypervisor microkernel 330. The hypervisor microkernel 330 can, for example, save the memory allocation and the SPA-to-GPA translation in shadow page tables 332.

Similarly, a guest partition, such as the guest partition 302, or a guest OS of the guest partition, such as the guest OS 304, can allocate virtual memory space to applications running on the guest OS. The virtual memory space can be a virtualization of a portion of a system memory space, such as the system memory space 342, that the hypervisor microkernel 330 allocated and presented to the guest partition using a GPA, such as the GPA 326. The guest partition or the guest OS can address the virtual memory using a guest virtual address (GVA), such as GVA 306. From the perspective of the applications running on the guest OS, the GVA may appear to start at physical address zero or any other page-aligned physical address and may span as large a region as is supported by the guest partition or the guest OS. The guest partition or the guest OS can, for example, save the memory allocation and the GPA-to-GVA translation in guest page tables 308.

As such, two layers of memory address translation may be needed for an application running on a guest OS to read, write, or copy data to or from a system memory space. As an example, a graphics application running on the guest OS 304, can write graphics output data to a virtual memory space addressed by the GVA 306. The guest OS 304 can use the guest page tables 308 to translate the GVA 306 into the GPA 326. The hypervisor microkernel 330 can use the shadow page tables 332 to translate the GPA 326 into the SPA 334. The SPA 334 can represent the address of the system memory space 342 where graphics output data is saved.

In an embodiment, the hypervisor microkernel 330 can be configured to translate the GVA 306 to SPA 334 directly, eliminating the GVA-to-GPA and the GPA-to-SPA translations. The GVA-to-SPA translation can be saved in the shadow page tables 332.

In an embodiment, a similar mapping of memory addresses can exist for a host partition, such as the host partition 312. For example, a host virtual address (HVA) 320 used to address a host virtual memory space can be translated into a host physical address (HPA) 328 using, for example, host page tables 318. The hypervisor microkernel 330 can further translate the HPA 328 into a system physical address (SPA) using, for example, the shadow page tables 332. The SPA 334 can represent an address of a memory space within the system memory 340. In a further embodiment, the hypervisor microkernel 330 can present the SPA 334 to the host partition 312. As such, the HPA 328 can be the same physical address as the SPA 334, eliminating the HPA-to-SPA translation.

In an embodiment, the hypervisor microkernel 330 can manage and provide the guest partition 302 and the host partition 312 access to the same memory space 342. For example, the hypervisor microkernel 330 can provide shared access of memory space 342 to the guest partition 302 and the host partition 312. In another embodiment, the hypervisor microkernel 330 can cycle and reallocate access of the memory space 342 between the guest partition 302 and the host partition 312. In such embodiments, the GPA 326 and the HPA 328 can be translated by the shadow page tables 332 into the same SPA 334 representing the address of the memory space 342. In addition to the GPA-to-SPA and HPA-to-SPA translations, the microkernel hypervisor 330 can save a GPA-to-HPA translation and/or a GVA-to-HVA translation in shadow page tables 332.

In the primary embodiment, the guest partition 302 data transfer between memory space 342 and a memory space of a remote computing device 360 can be offloaded to the host partition 312. The guest partition 302 can detect the guest OS 304 attempt to instruct a virtualized hardware device of the guest partition 302 to read, write, or copy data (hereinafter "data transfer") to or from the memory space in the remote computing device 360. In an embodiment, this detection may comprise the guest OS 304 sending an instruction indicative of the data transfer attempt to a virtual machine (VM) of the guest partition 302 intended for a virtual CPU or a virtual DMA controller of the VM. In another embodiment, the guest partition 302 may be configured to use drivers, such as VSC 216 in FIG. 2, to receive and manage the guest OS 304 data transfer requests.

The guest partition 302 may send an operation description to the host partition 312. The operation description may include, for example, data transfer instruction 322 instructing the host partition 312 to offload the execution of the data transfer from the guest partition 302 to the host partition 312. The data transfer instruction 322 may consist of a data transfer description (e.g. read, write, or copy), the type and amount of data to be transferred, address of the source memory space (e.g. the guest physical address 326 representative of the memory space 342), and the address of the destination memory space (e.g. the address of the memory space of the remote display device 360). In an embodiment, the guest partition 302 can send the operation description over a VMBus, such as VMBus 226 in FIG. 2, using a VSC, such as VSC 216 in FIG. 2. The host partition 312 can receive the operation description over the VMBus using a VSP, such as VSP 218 in FIG. 2. In another embodiment, the guest partition 302 can send the operation description to the host partition 312 using the hypervisor microkernel 330 or using a packet over a communication bus, such as a TCP/IP network. Upon sending of the operation description, the guest partition 302 can free or otherwise reuse guest virtual resources involved in the data transfer.

In response to the operation description, the host partition 312 can communicate with the hypervisor microkernel 330 and query a host physical address space (HPA) 328 that the host partition 312 can use to transfer the data to the remote computing device 360. The hypervisor microkernel 330 can determine a memory space in the system memory 340 allocated to the host partition 312 and can use, for example, the shadow page tables 332 to provide the corresponding HPA 328 to the host partition 312.

In an embodiment where the memory space is the same for the host partition 312 and the guest partition 302, such as the memory space 342, the hypervisor microkernel 330 can use, for example, the GPA-to-HPA translation stored in the shadow pages 332 to provide the corresponding HPA 328 to the host partition 312. The host partition 312 need not transfer data from the memory space 342 to another memory space in the system memory 340.

In an embodiment where the memory space is different between the host partition 312 and the guest partition 302, the hypervisor microkernel 330 can provide the host partition 312 two HPAs; the first and second HPA can represent the corresponding host physical addresses of the memory space 342 and the different memory space respectively. The hypervisor microkernel 330 can, for example, use the GPA-to-SPA and HPA-to-SPA translations saved in the shadow page tables 332 to provide the two HPAs to the host partition 312. In a further embodiment where the HPA and SPA are the same, the HPA-to-SPA translation step can be eliminated. The hypervisor microkernel 330 can instead present two SPAs to the host partition 312 corresponding to the memory space 342 and the different memory space respectively. The host partition 312 can then transfer the data from the memory space 342 to the different memory space using the host virtual resources or using the underling physical resources of the computer system 300. For example, the host partition 312 can use the virtual processors 314 or the virtual DMA controllers 316 for a DMA transfer of the data from the memory space 342 to the different memory space. Alternatively, the host partition 312 can directly use the processor 21 or the DMA controller 80 for a DMA transfer of the data from the memory space 342 to the different memory space.

In a further embodiment where the operation description is sent from the guest partition 302 to the host partition 312 using the hypervisor microkernel 330, the host partition 312 may receive the HPA 328 or the SPA directly from the hypervisor microkernel 330 eliminating the need for the host partition 312 to query the hypervisor microkernel 330.

In response to receiving the HPA 328, the host partition 312 can translate the HPA 328 into a host virtual address (HVA) 320 using, for example, host page tables 318. The host partition 312 can process the operation description and instruct the host virtual resources or the underlying physical resources of the computer system 300 to execute the operation contained therein using the HPA 328 or HVA 320.

The host partition 312 can manage and determine the availability of the host virtual resources and/or the availability of the underlying physical resources of the computer system 300. The host partition 312 can instruct the available virtual or physical resources to process and transfer the data between the memory space corresponding to the HPA 328 or the HVA 320 and the memory space of the remote computing device 360. For example, the host partition 312 can instruct one or more of the virtual processors 314 to transfer the data. The instructed virtual processors 314 can further instruct one or more virtual DMA controllers 316 or one or more virtual resources with DMA capability to transfer the data using a DMA transfer. In response to the instruction, the instructed virtual DMA controllers 316 or virtual resources with DMA capability can effectuate the data transfer without the virtual processors 314 devoting resources to the data transfer operation itself. In another example, the host partition 312 can instruct the processor 21 to transfer the data. The instructed processor 21 can further instruct the DMA controller 80 or one or more physical resources with DMA capability to transfer the data using a DMA transfer. In response to the instruction, the instructed DMA controller 80 or physical resources with DMA capability can effectuate the data transfer without the processor 21 devoting resources to the data transfer operation itself. In an embodiment, the host partition 312 can transfer the data to the remote computing device 360 over a network 350 by routing the data through the NIC 53 of computer system 300 as previously described.

When transferring the data, the instructed devices, such as one or more of the virtual processors 314, one or more of the virtual DMA controllers 316, the processor 21, and/or the DMA controller 80 can send a status message to the host partition 312 indicative of the data transfer status. The host partition 312 may query and receive from the instructed devices the status of the data transfer. Upon completion of the data transfer by the virtual DMA controllers 316, the virtual DMA controllers 316 can, for example, send a status message consisting of an interrupt to the virtual processors 314. Likewise, when a DMA data transfer is effectuated by the DMA controller 80, the DMA controller 80 can send a status message consisting of an interrupt to the processor 21. The interrupt message can cause the corresponding processor (i.e. the virtual processors 314 or the processor 21 as applicable) to save the processor state and handle an event associated with the processor interrupt. Similarly, and as an example, upon completion of a data transfer by the virtual processors 314 or the processor 21, the corresponding processor can send interrupts or inter-processor interrupts to the host resources indicating that the transfer is complete. Upon completion of the data transfer, the host partition 312 can free or otherwise reuse the host virtual resources or the underlying physical resources of the computer system 300 that were involved in the data transfer.

In response to receiving the status message, the host partition 312 can send a communication message over the communication bus to the guest partition 302. The communication message may comprise, for example, data transfer status 324 indicative of the status of the data transfer. As previously explained, in an embodiment, the communication bus can be a VMBus. In such case, the data transfer status 324 may include a VMBus interrupt sent from the host partition 312 using a VSP and received by the guest partition 302 using a VSC. In another embodiment, the data transfer status 324 can be sent using the hypervisor microkernel 330 or using another communication bus, such as a TCP/IP network.

In response to receiving the communication message from the host partition 312, the guest partition 302 may complete the original operation, or may free or otherwise use the resources in which the data was stored. For example, an application running on the guest OS 304 can access and write new data in the virtual memory space corresponding to the GVA 306. The hypervisor microkernel 330 managing the access to the system physical addresses may reallocate system physical addresses or update the shadow page tables 332.

Figure 4:
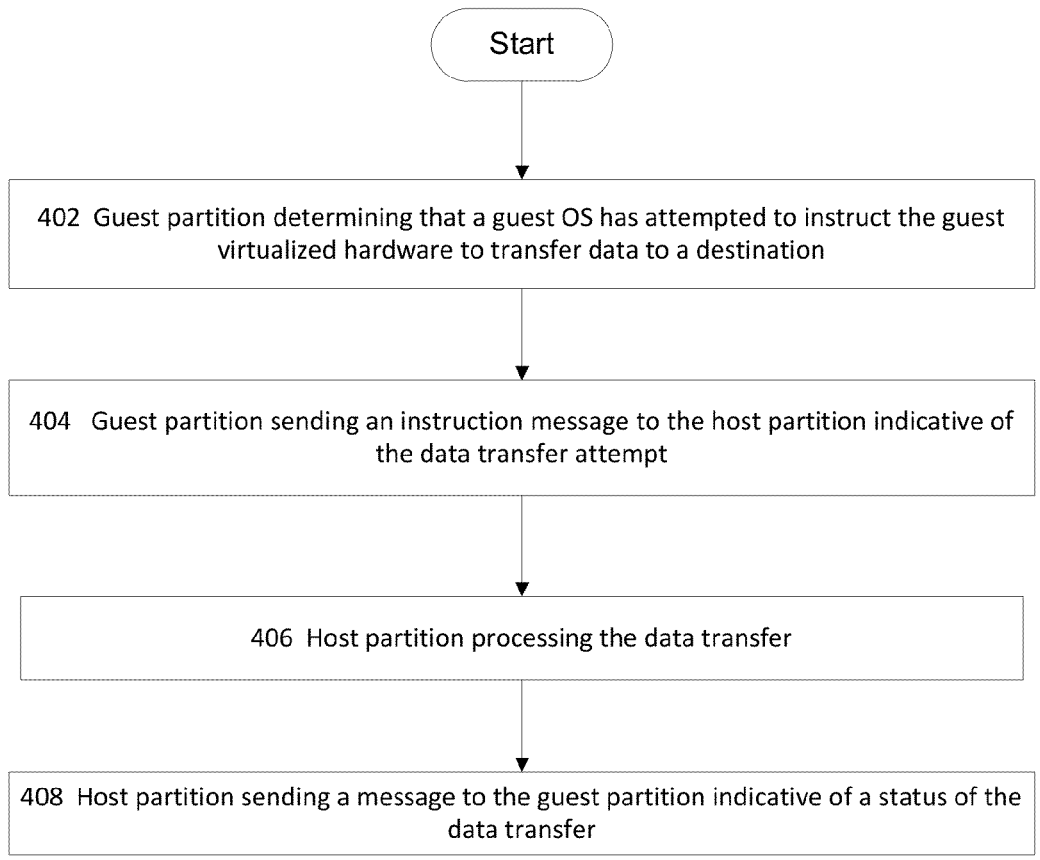
FIG. 4 depicts example operational procedures for offloading data transfer operations from a guest partition to a host partition.

FIG. 4 depicts an example embodiment of a method for transferring data from a virtual machine to a remote computing device. The operational procedures of FIG. 4 may be implemented to offload the data transfer operations from a guest to a host partition within a computing system that has been partitioned in virtual machines. The guest partition, the host partition, the computing system, and the remote computing device can comprise computing components such as described above in FIGS. 1-3. It may be appreciated that not all operations are implemented in all embodiments of the invention.

Operation 402 depicts a guest partition determining that a guest OS of the guest partition has attempted to instruct a virtualized hardware device of the guest partition to transfer data to or from a destination that can comprise a memory space in the remote computing device. The data transfer may be, for example, a DMA transfer. The remote computing device can be a device connected via a network to a computing system containing the guest partition or can be another partition within the computing system. As described above in FIG. 3, this determination may comprise the guest OS sending an instruction indicative of the data transfer attempt to a virtual machine (VM) of the guest or may comprise the guest partition configured to use drivers to receive and manage the guest data transfer requests. Operation 402 may also include the guest partition translation of memory addresses (e.g. HVA and GPA).

Operation 404 depicts the guest partition sending to the host partition an operation description indicative of instructing the host partition to transfer data to or from the destination. As described above in FIG. 3, the operation description may consist of a description of the data transfer (e.g. read, write, or copy), the type and amount of data to be transferred, the address of the source memory space (e.g. the guest physical address), and the address of the destination memory space (e.g. the memory space of the remote computing device). The operation description can be sent using a communication network, such as a VMBus or a TCP/IP network, or using a hypervisor microkernel. Operation 404 may also include the guest partition freeing and reusing the guest virtual resources that were involved in the data transfer attempt to execute operations other than the data transfer.

Operation 406 depicts the host partition receiving the operation description and processing the operation contained therein. As described above in FIG. 3, a hypervisor microkernel can map memory addresses (e.g. GPA, HPA, and SPA). The host partition can manage the host virtual resources or the underlying physical resources of the computing system and instruct the available host virtual or physical resources to transfer the data between the memory space corresponding to a HPA or a SPA and the destination memory space. The data transfer may comprise a DMA transfer. The host partition can query and receive from the virtual or physical resources a message indicative of a status of the data transfer. Upon completion of the data transfer, the host partition can free or otherwise reuse the host virtual resources or the underlying physical resources of the computing system that were involved in the data transfer.

Operation 408 depicts the host partition sending a message to the guest partition indicative of a status of the data transfer. As described in FIG. 3, the message can be sent using the communication network, such as the VMBus or the TCP/IP network, or using the hypervisor microkernel. In an embodiment, the guest partition can complete the original operation and can free or otherwise use the resources in which the data was stored. The hypervisor microkernel can also update the mapping of GPA, HPA, SPA.

Figure 5:
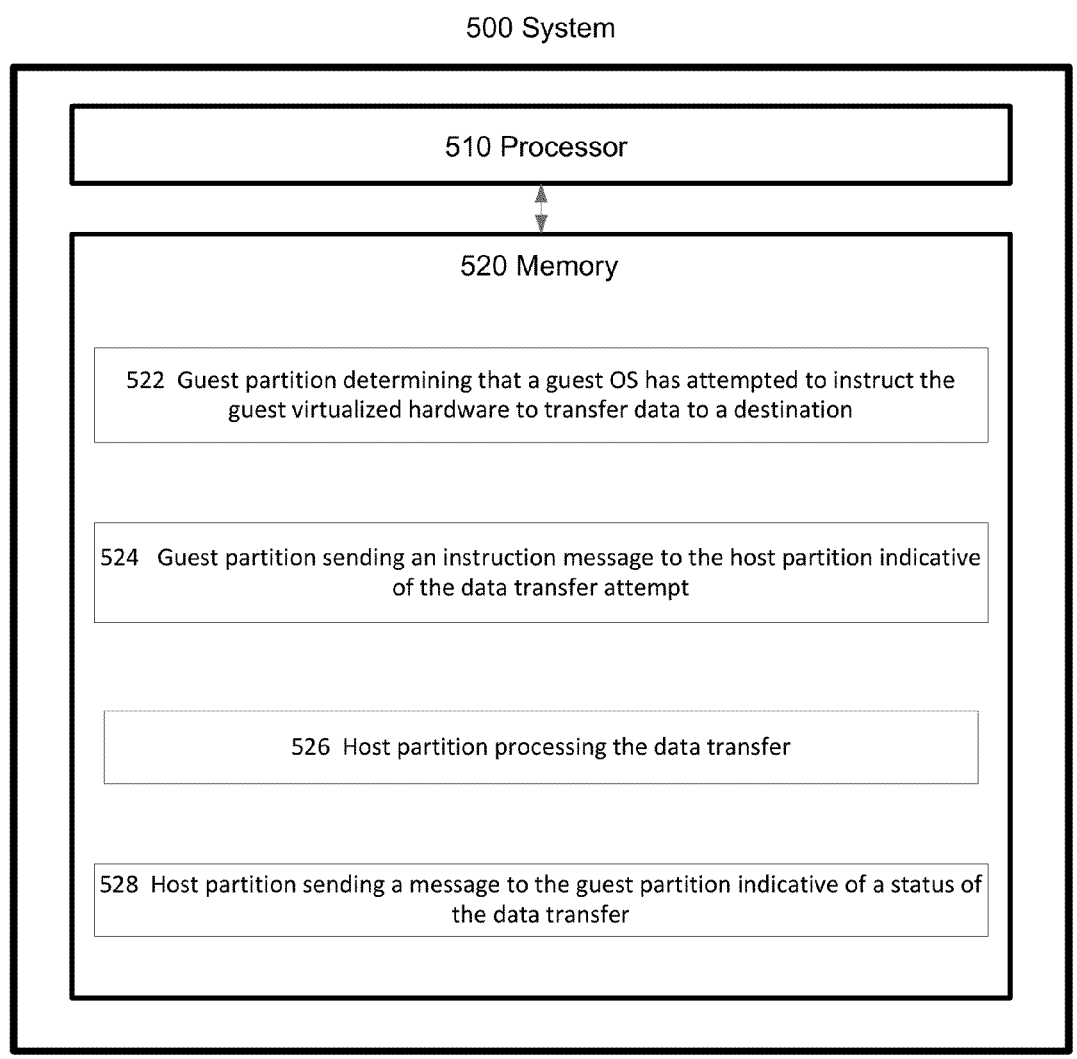
FIG. 5 depicts example system and computer-readable medium for offloading data transfer operations from a guest partition to a host partition.

FIG. 5 depicts an exemplary system for transferring data from a guest partition to a remote computing device as described above. System 500 comprises a processor 510 and memory 520. In an embodiment, the processor 510 can be implemented as processing unit 21 in FIG. 1, while the memory 520 can be implemented as having one or more of the components of the system memory 22 in FIG. 1. The memory 520 further comprises computer instructions configured to cause the system to transfer data to the remote computing device. The data transfer can comprise a DMA transfer. Block 522 illustrates determining by a guest partition that a guest OS has attempted to instruct the guest virtualized hardware to transfer data to or from a destination that can comprise a memory space in the remote computing device. Block 524 illustrates the guest partition sending an instruction message to the host partition indicative of the data transfer attempt. Block 526 illustrates the host partition processing the data transfer to the remote computing device. Block 528 illustrates the host partition sending a message to the guest partition indicative of a status of the data transfer.

While the present disclosure has been described in connection with the preferred aspects, as illustrated in the various figures, it is understood that other similar aspects may be used or modifications and additions may be made to the described aspects for performing the same function of the present disclosure without deviating there from. Therefore, the present disclosure should not be limited to any single aspect, but rather construed in breadth and scope in accordance with the appended claims. For example, the various procedures described herein may be implemented with hardware or software, or a combination of both. The invention may be implemented with computer-readable storage media and/or computer-readable communication media. Thus, the invention, or certain aspects or portions thereof, may take the form of program code (i.e., instructions) embodied in tangible media, such as floppy diskettes, CD-ROMs, hard drives, or any other machine-readable storage medium. Likewise, the invention, or certain aspects or portions thereof, may be embodied in propagated signals, or any other machine-readable communications medium. Where the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A system for offloading a data transfer task from a guest partition to a host partition, comprising:
 a processor; and
 a memory communicatively coupled to the processor when the system is operational, the memory bearing instructions that, upon execution by the processor, cause the system to at least:
 determine that the guest partition attempted to instruct virtualized hardware to process a data transfer from a data source location in guest physical memory space of a first virtual machine to a data destination location in physical memory space of a second virtual machine;
 send an instruction message from the guest partition to the host partition indicative of the data transfer;
 cause the host partition to process the data transfer; and
 send a message from the host partition to the guest partition indicative of a status of the data transfer.

2. The system of claim 1, wherein the data source location is a location in the guest partition physical address.

3. The system of claim 1, wherein the data destination location is a location outside the virtualized hardware.

4. The system of claim 1, wherein the data transfer is a direct memory access (DMA) transfer.

5. The system of claim 1, wherein the instruction message compromises a read, write, or data copy operation, type and amount of data to be transferred, the source location, and the destination location.

6. The system of claim 1, wherein data to be transferred is contained in one memory location in the virtualized hardware.

7. The system of claim 1, wherein the host partition performs the data transfer using one or more virtual processors, one or more virtual DMA controllers, or one or more virtual devices with DMA capability.

8. The system of claim 1, wherein the host partition performs the data transfer using physical processors, physical DMA controllers, or physical devices with DMA capability.

9. A method for offloading a data transfer task from a guest partition to a host partition, comprising:
 determining that the guest partition attempted to instruct virtualized hardware to process a data transfer from a data source location in physical memory space of a first virtual machine to a data destination location in physical memory space of a second virtual machine;
 sending an instruction message from the guest partition to the host partition indicative of the data transfer;
 causing the host partition to process the data transfer; and
 sending a message from the host partition to the guest partition indicative of a status of the data transfer.

10. The method of claim 9, wherein the data source location is a location in the guest partition physical address and the data destination location is a location outside the virtualized hardware.

11. The method of claim 9, wherein the data transfer is a direct memory access (DMA) transfer.

12. The method of claim 9, wherein the instruction message compromises a read, write, or data copy operation, type and amount of data to be transferred, the source location, and the destination location.

13. The method of claim 9, wherein data to be transferred is contained in one memory location of the virtualized hardware.

14. The method of claim 9, wherein the host partition performs the data transfer using physical processors, physical DMA controllers, or physical devices with DMA capability.

15. A computer-readable storage medium for offloading a data transfer task from a guest partition to a host partition, bearing computer instructions that, upon execution on a computer, cause the computer to perform operation comprising:
    determining that the guest partition attempted to instruct virtualized hardware to process a data transfer from a data source location associated with a first virtual machine to a data destination location associated with a second virtual machine;
    sending an instruction message from the guest partition to the host partition indicative of the data transfer;
    causing the host partition to process the data transfer; and
    sending a message from the host partition to the guest partition indicative of a status of the data transfer.

16. The computer-readable storage medium of claim 15, wherein the data source location is a location in the guest partition physical address and the data destination location is a location outside the virtualized hardware.

17. The computer-readable storage medium of claim 15, wherein data to be transferred is contained in one memory location in the virtualized hardware.

18. The computer-readable storage medium of claim 15, wherein the instruction message compromises a read, write, or data copy operation, a data source location, and an amount of data to be processed.

19. The computer-readable storage medium of claim 15, wherein the instruction message compromises a read, write, or data copy operation, type and amount of data to be transferred, the source location, and the destination location.

20. The computer-readable storage medium of claim 15, wherein the host partition performs the data transfer using physical processors, physical DMA controllers, or physical devices with DMA capability.

* * * * *